Patented Feb. 27, 1934

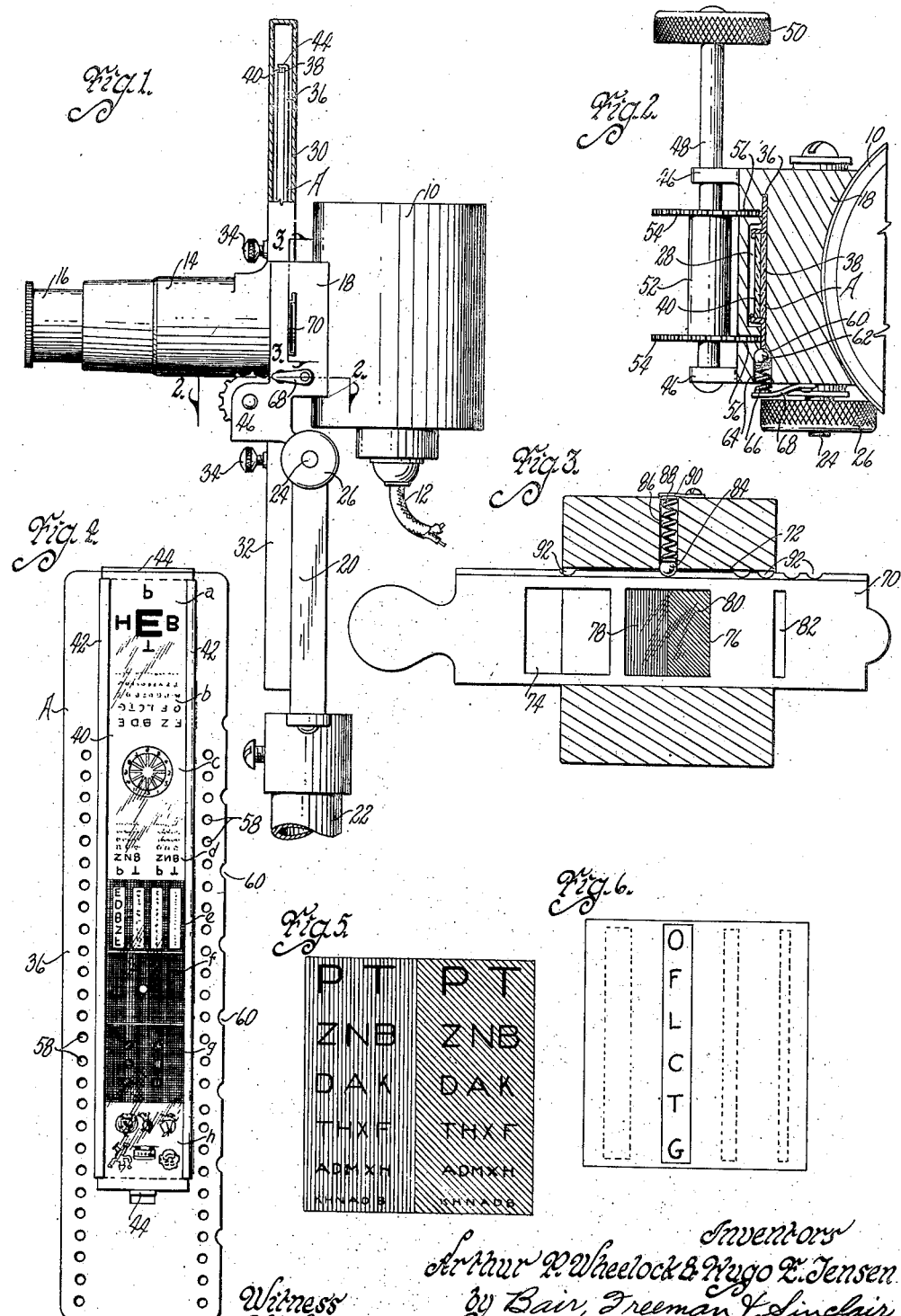

1,949,067

UNITED STATES PATENT OFFICE

1,949,067
APPARATUS FOR TESTING VISION

Arthur P. Wheelock and Hugo E. Tensen, Des Moines, Iowa

Application November 28, 1932
Serial No. 644,640

2 Claims. (Cl. 88—20)

The object of this invention is to provide an improved method and apparatus for projecting matter upon a screen for the purpose of testing vision, and for arranging a series of charts in such manner that they may conveniently be projected according to an accepted routine for test purposes.

A further object of the invention is to provide an improved construction for a non-flexible slide carrying a series of test charts arranged in a definite sequence, together with means for accurately placing a selected chart in position for projection.

Still another object is to provide improved means for masking or otherwise controlling the passage of light rays through a portion of a translucent slide, by means of a separate opaque slide plate arranged for movement at right angles to the projecting slide and provided with a series of different light apertures to coact with selected parts of the projecting slide, together with means for accurately positioning the masking plate in the desired location.

Still another object of the invention is to provide a test chart having series of test letters of different size arranged in vertical columns capable of being selectively projected for the purpose of testing and determining the convergence or accommodation of the eyes of a patient.

Another and further object is to provide an improved test chart including two identical sets of test letters of varying size, the two sets being arranged side by side on the chart and capable of being projected simultaneously through the use of different color plates for the purpose of making the final check as to the corrective lenses which has been determined to be proper for the patient.

Another object of the invention is to provide an improved test chart having a group of pictorial representations, especially adapted for testing the vision of illiterates or of children too young to read the ordinary letter test charts, and providing a fixation or attention directing means for this type of patient.

With these and other objects in view our invention consists in the construction, arrangement and combination of the various parts of our device, whereby the objects contemplated are attained, as hereinafter more fully set forth, pointed out in our claims, and illustrated in the accompanying drawing, in which:—

Figure 1 is a side elevation, partly in section, illustrating a portion of a projector and other equipment adapted for carrying out our invention.

Figure 2 is an enlarged horizontal section on the line 2—2 of Figure 1.

Figure 3 is an enlarged vertical section on the line 3—3 of Figure 1.

Figure 4 is a face view of our improved non-flexible projecting slide with a series of test charts arranged thereon in the desired sequence, this slide being illustrated in the position which it occupies in the projector.

Figure 5 is an enlarged view of one of the chart units of the slide as projected upon a screen, embodying duplicate sets of test letters arranged side by side and projected in connection with two color plates for making the final test.

Figure 6 is a diagrammatic view, illustrating the method of projecting a chart involving a series of vertically arranged columns of test letters adapted to be projected singly to produce a vertical strip or streak on the screen.

Our invention is not limited to a particular type of projecting machine, but we have illustrated a projector which is more or less common and well-known so far as its general features are concerned, which has been modified and changed to some extent to adapt it to our particular means and method of projecting test charts. The projector shown includes an air cooled lamp housing 10 adapted to contain an electric lamp, not shown, capable of being supplied with current through a cord 12 connected with any suitable outlet. Mounted in front of the lamp housing 10 is a projecting tube 14 carrying with it a lens carrier 16, which is telescopically engaged and adapted to be adjusted for securing the desired focus. The projecting tube 14 is mounted on a base block 18, which is fixed to the housing 10 and which is suitably apertured to permit the passage of light from the housing to the tube.

The parts thus far described are supported on a frame 20 which is in turn fixed to a supporting standard 22. The upper end of the frame 20 has an adjustable connection with the lower part of the base block 18, as by means of a screw 24 with a thumb nut 26 on one end, permitting the projecting mechanism to be adjusted on a transverse horizontal axis and held in the desired position of adjustment by tightening said nut.

The base block 18 is formed with a vertical channel 28 extending therethrough centrally of its forward side and intersecting the light passage or aperture through which rays of light pass to the projecting tube 14. The vertical channel 28 is adapted to receive a projecting slide designated generally by the character A. The slide A when mounted in the projector preferably is enclosed by an upper slide housing 30 and a lower slide housing 32 extending respectively above and below the ends of the channel 28 and removably secured to the base block 18 by any suitable means such as set screws 34.

The projecting slide A includes an elongated metallic strip 36 having a longitudinal opening extending therethrough throughout the greater portion of its length, the plate and its opening providing a support for a glass slide 38 upon which the test charts are depicted. The face of the glass plate 38 on which the characters are carried preferably is covered by a protecting plate 40 of clear glass. At the side margins of the opening in the plate 36 there are formed flanged walls 42 for engaging the side edges of the glass plates 38 and 40 for holding them in place and at the ends thereof are provided lugs 44 for preventing longitudinal movement of the glass plates.

At the lower front part of the base block 18 are bearing members 46 in which a shaft 48 is rotatably mounted, said shaft having an operating wheel 50 on one end. Between the bearing members 46 a sleeve 52 is fixed to the shaft 48 and said sleeve has at each end a toothed wheel 54. The wheels 54 project at their rear sides into slots 56 formed in the forward side of the base block 18 and intersecting the vertical channel 28. The teeth of the wheels 54 are adapted to engage in spaced apertures 58 formed in side marginal portions of the base plate 36 of the slide member A. Thus means is provided, under manual control through manipulation of the wheel 50, for causing the slide plate A to be moved vertically, either up or down, and to be adjusted to the desired position with respect to light rays passing into and through the projecting tube 14 and lens carrier 16.

We also provide means for centering or properly locating the slide plate A so that any selected portion of its chart arrangement may be placed and held positively in position for projection. This means includes a series of segmental notches 60 formed in one margin of the base plate 36 and adapted to be engaged selectively by a ball detent 62 arranged in a recess 64 at one side of the member 18. The ball detent 62 is baked by a coil spring 66 engaged at its outer end by a holding arm 68 pivotally mounted on the outer face of said member 18.

The projecting slide A has its transparent plate 38 divided longitudinally into a series of test chart units here designated by the characters $a$, $b$, $c$, $d$, $e$, $f$, $g$ and $h$. Some at least of these units are of conventional and well-known type, such as have been heretofore employed for testing vision by means of use on test cards or other methods of display. They preferably are arranged in order from top to bottom of the slide plate 38 in suitable sequence for use in following an accepted routine of examination or test. This arrangement makes it very convenient for the operator to follow his established practice in displaying different test charts, by merely moving the projecting slide A along its channel, causing it to move vertically by appropriate operation of the hand wheel 50. The uppermost test chart unit $a$ for instance is composed of a series of fairly large letters, while the unit $b$ is composed of progressively smaller letters, such as commonly referred to as forty, thirty, twenty and ten foot letters, having reference to the distance at which they should readily be discernible by the patient. The unit $c$ is of the type of test chart commonly employed for detecting astigmatism.

The chart unit $d$ differs from those commonly employed in that it involves two duplicate sets of letters, each set including lines of different sized letters and the two sets being arranged side by side on the slide. The unit $d$ is designed to be projected upon the screen in connection with means for imparting different colors to the two sets of letters for the particular purpose of checking errors that have previously been found and corrections that have been made by employing the units such as $a$ and $b$ and determining whether such corrections are the best that can be made for the eyes of the patient. By employing two duplicate sets of letters side by side on the same chart, or in other words—by simultaneously projecting one set of letters under one color and exactly the same set of letters under another color, we have found that it is possible to avoid confusion of the patient as to which colored set appears to him to be more distinct or whether they seem to be uniformly displayed under the two colors. The method of projecting the double unit $d$ under the two colors will be more specifically described at a later point in the specification.

The chart unit $e$ is likewise different from the conventional chart in that provision is made for arranging a series of vertical columns of test letters of different size, such for instance as ten, twenty, thirty and forty foot letters, in columns side by side on the unit and on the same chart. The columns of test letters composing this unit are designed to be projected separately and selectively to provide vertical strips or streaks on the screen, particularly for the purpose of testing the eyes to determine convergence or accommodation. The method of projecting in connection with this unit will be hereinafter more fully described.

The chart unit $f$ is of conventional form, embodying merely the use of a small dot or spot of light on the screen, as employed by some operators for determining convergence or accommodation.

The unit $g$ consists merely of a set of dots of different colors and may be employed merely to determine the ability of the patient to determine colors, or in other words—to detect color-blindness.

The chart unit $h$ embodies a method which we have devised for conveniently and accurately testing the vision of illiterates or children too young to read the ordinary test letters. The unit consists of a series of pictorial representations which may be more or less grotesque or fanciful, or in some way having particular interest and fixation value for attracting the attention and interest of the patient of this particular type. The unit is projected upon the screen and the operator uses the pictures by inducing the patient to describe or point out certain details there represented, in this manner determining the ability of the patient to discern the detail and thus testing the acuity of vision.

In connection with the apparatus and equipment heretofore described, we employ a perforated mask or control plate 70 formed of opaque material, such as sheet metal. The mask or control plate 70 is arranged for sliding movement in a transverse channel 72 extending through the base block 18 in position to intersect the light aperture through which rays of light are permitted to travel from the lamp housing to the projecting tube 14 and lens carrier 16. The channel 72 preferably is located behind the vertical channel 28 and thus the mask or control plate 70 is arranged at right angles and adjacent to the projecting slide plate A.

The plate 70 is formed with a series of openings therethrough, the first opening being of rectangular form and designated by the numeral 74. It corresponds in size to one of the test chart units a to h inclusive of the projecting slide and when it is placed in alignment with the light opening and the chart unit to be projected, it permits the rays of light to pass through the plate 70 for the purpose of projecting the selected unit.

The next opening through the mask or control plate 70 is of the same size as the unit 74 and it is designated by the numeral 76. This opening contains two plates of colored glass placed side by side or edge to edge, a plate of red glass being designated by the numeral 78 and a plate of green glass by the numeral 80. This element of the mask or control plate 70 is designed to be used in connection with the chart unit d of the projecting slide for causing red and green backgrounds for the two duplicate sets of letters of this unit as previously referred to and as illustrated in Figure 5. It is thought to be unnecessary to give further explanation as to the method of using this particular unit with the two colored backgrounds, as it will be readily understood by those skilled in the art.

Another opening of the mask or control plate 70 is a narrow vertically arranged slit opening 82, which is employed selectively with the vertical columns of the chart unit e in a manner previously referred to and as illustrated particularly in Figure 6. By moving the plate 70 lengthwise to the proper position, the desired vertical column of letters of the unit e may be projected as a vertical strip or streak upon the screen. It is a matter of considerable convenience that each of the columns of the unit e is composed of a series of letters of the same size and designed to be read at a certain distance according to the requirements for testing vision and also that the means for masking all of the chart unit with the exception of the desired vertical streak is employed in the same slide or controlling plate which is employed in connection with other units of the projecting slide. This arrangement is of convenience to the operator and saves confusion and embarrassment in hunting for separate members which ordinarily are used for obtaining the desired projection.

We provide means for mechanically assisting the operator in placing the mask or control plate 70 in the desired position for employing either of the openings 74, 76 or 82. This means comprises a ball detent 84 fitted in a recess 86 in the base block 18 and backed by a coil spring 88. The outer end of the spring 88 is engaged by an arm 90 pivotally secured to the top of the base block. The ball detent 84 is adapted to engage selectively in any one of a series of segmental notches 92 formed in the upper edge of the plate 70, one of said notches being provided for each of the openings 74 and 76 and four of said notches being employed in connection with the slit opening 82, to assist in aligning said slit opening with either one of the four vertical columns of the chart unit e.

Our improved mechanism and equipment provides a convenient and accurate means and method for enabling an operator to project the desired test charts without delay or confusion and thus enables him to obtain better results in testing the vision of a patient according to accepted methods and according to the desired or established routine.

Some changes may be made in the construction and arrangement of the parts of our device without departing from the real spirit and purpose of our invention, and it is out intention to cover by our claims, any modified forms of structure or use of mechanical equivalents which may be reasonably included within their scope.

We claim as our invention:—

1. In an apparatus for testing vision, a projecting device having a lamp house and a projecting tube, a base block interposed between the house and tube, having an aperture for the passage of light, and provided with a vertical channel in its forward face and an intersecting transverse channel, a rigid strip slidable in the first channel, having rows of holes at its sides, notches in a side edge, and a central lengthwise opening, a translucent strip in said opening provided with spaced units of indicating characters, the units being opposite the respective notches, toothed wheels, meshing with said holes, a shaft suitably journaled, carrying the toothed wheels and an operating wheel, a transverse strip slidable in the second channel, having a series of various sized openings adapted to register with a unit or parts of it when a unit registers with the aperture, said transverse strip having notches in an edge, corresponding to its various openings, and spring-pressed detents for engaging in the notches of the strips.

2. In an apparatus for testing vision, a projecting device having a lamp house and a projecting tube, a base block interposed between the house and tube, having an aperture for the passage of light and provided with a vertical channel and an intersecting transverse channel, a vertical strip slidable in the first channel, having rows of holes at its sides, notches in said strip and a central lengthwise opening, a translucent strip in said opening provided with spaced units of indicating characters, the units corresponding to the respective notches, toothed wheels meshing with said holes, a shaft suitably journaled, carrying the toothed wheels and an operating wheel, a transverse strip slidable in the second channel, having a series of various openings of differing characteristics adapted to register with a unit or parts of it when a unit registers with the aperture, said transverse strip having notches corresponding to its various openings and spring pressed detents for engaging in the notches of the two strips.

ARTHUR P. WHEELOCK.
HUGO E. TENSEN.